(12) United States Patent
Hilbk (10) Patent No.: US 8,366,174 B2
(45) Date of Patent: Feb. 5, 2013

(54) CONVERTIBLE VEHICLE WITH A DISPLACEABLE ROOF PART

(75) Inventor: Holger Hilbk, Dissen a.T.W. (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 203 days.

(21) Appl. No.: 12/676,304

(22) PCT Filed: Sep. 2, 2008

(86) PCT No.: PCT/DE2008/001467
§ 371 (c)(1),
(2), (4) Date: Apr. 12, 2010

(87) PCT Pub. No.: WO2009/030215
PCT Pub. Date: Mar. 12, 2009

(65) Prior Publication Data
US 2010/0230995 A1 Sep. 16, 2010

(30) Foreign Application Priority Data
Sep. 6, 2007 (DE) .......................... 10 2007 042 308

(51) Int. Cl.
*B60J 7/12* (2006.01)
*B60J 7/047* (2006.01)
(52) U.S. Cl. ......... 296/107.01; 296/107.17; 296/216.03; 296/107.15

(58) Field of Classification Search .. 296/107.01–107.2, 296/219, 107.08, 107.09, 216.03
See application file for complete search history.

(56) References Cited

U.S. PATENT DOCUMENTS

| 2,210,590 | A | * | 8/1940 | Jobst | 296/107.17 |
| 5,429,409 | A | * | 7/1995 | Corder et al. | 296/108 |
| 6,419,296 | B2 | | 7/2002 | Dintner et al. | |
| 8,056,956 | B2 | * | 11/2011 | Heselhaus | 296/107.15 |
| 2005/0104412 | A1 | | 5/2005 | Perakis | |
| 2006/0290164 | A1 | * | 12/2006 | Bunsmann | 296/107.01 |
| 2008/0272626 | A1 | | 11/2008 | Heselhaus | |
| 2009/0140554 | A1 | * | 6/2009 | Von Malmborg et al. | 296/219 |

FOREIGN PATENT DOCUMENTS

| DE | 9108242 U1 | 11/1992 |
| DE | 102005040995 B3 | 9/2006 |
| DE | 102005042982 | 1/2007 |
| EP | 0899142 A2 | 3/1999 |
| WO | WO2007009432 | * 1/2007 |

* cited by examiner

*Primary Examiner* — Dennis Pedder
(74) *Attorney, Agent, or Firm* — Gifford, Krass, Sprinkle, Anderson & Citkowski, P.C.

(57) ABSTRACT

A convertible vehicle has a movable top with a sunroof part that is movable with respect to the surrounding top region. The sunroof part has a closed position and an open position, as well as an interference-preventing position and an intermediate position. The top is movable from the top closed position with the sunroof part in the closed position and the top is movable from the top closed position with the sunroof part in the open position.

10 Claims, 16 Drawing Sheets

CONVERTIBLE VEHICLE WITH A DISPLACEABLE ROOF PART

REFERENCE TO RELATED APPLICATIONS

This patent application is the United States national phase application of Patent Cooperation Treaty Application No. PCT/DE2008/001467, filed Sep. 2, 2008, which claims priority from German patent application No. DE 10 2007 042 308.1, filed Sep. 6, 2007, the entire content of both of which are incorporated herein by reference.

FIELD OF THE INVENTION

The present invention relates to a convertible vehicle having at least one top which is movable between closed and open positions and which includes a sunroof part which is movable with respect to a surrounding top region.

BACKGROUND OF THE INVENTION

Convertible vehicles are known in which the top has a sunroof part in its front region. The sunroof part is displaceable to the rear with respect to the surrounding top regions. To open the entire top, the sunroof part is initially opened while the rest of the top remains closed. After the sunroof reaches its completely open position, the top is then moved to an open convertible position. As such, opening the top from the closed position, when the sunroof is also closed, is very time consuming.

SUMMARY OF THE INVENTION

The present invention overcomes some of the limitations of the prior art. In embodiments of the present invention, it is possible to open the top of a convertible vehicle without previously having to open the sunroof part. Therefore, the opening of the top from the closed position is considerably accelerated. The top can be moved from the closed position, where it is directly or indirectly latched to the windshield frame, while the sunroof part is still in the closed position.

Preferably, the top can be opened no matter what position the sunroof part is in, including completely open, completely closed, or any intermediate position in between. No thought then has to be given to the instantaneous position of the sunroof part for the actuation of the top opening. No time-consuming sunroof movement has to be carried out prior to the raising of the top. The complete top opening can occur equally quickly with the sunroof part in any position.

Preferably, the sunroof part can automatically displaced into a completely open position during the top opening movement or, if the sunroof part is already in the completely open position, the sunroof part can be held in this position.

The instantaneous position of the sunroof part can be automatically sensed and the sunroof part may be automatically moved into its completely open while the top is opening.

For this purpose, a separate drive is provided for the displacement of the sunroof part independently of a drive for the top movement.

The sunroof part can form the frontmost end of the movable top, in the middle region, thereby enabling a large transparent region above the front occupants.

In some preferred embodiments, the sunroof part can moved beyond the headrests of a rearmost row of seats when the sunroof is in its completely open position and the top is being opened. This allows the top to be lowered down a lot in this phase of the movement. The surrounding top regions transversely bordering the sunroof part can then be guided past the headrests to the side thereof.

In the end phase of the top opening, the sunroof part may be automatically moved into an intermediate position before the top reaches the completely open position. If the sunroof part remains generally in the same orientation, the sunroof part may serve as a cover for portions of the top disposed thereunder, and the sunroof part is guided as far forward as possible toward a rear wall of the passenger compartment.

BRIEF DESCRIPTION OF THE DRAWINGS

Further advantages and features of the invention result from an embodiment shown schematically in the drawings and described in the following.

DETAILED DESCRIPTION OF THE INVENTION

The convertible vehicle 1 in accordance with the present invention can—as indicated in the drawing—be a four-seat or multi-seat vehicle provided with at least one rear bench. A two-seater is also possible. In this respect, a vertical rear end can be provided as, for instance, with SUVs, compact vehicles, station wagons or vans. Alternatively, a notch back or a hatchback is also possible.

The entire top 2 is movable and adjoins a windshield frame 3 directly or indirectly in a closed position. The top may be a retractable hardtop (RHT), which includes a plurality of more or less plate-shaped assemblies with mutually separated surfaces. Or, the top may be a soft top with a common flexible covering spanning the top. The top 2 shown as a soft top, but the actual flexible covering is not shown in the drawing Figures.

The entire movable top 2 can be displaced downwardly when it is opened. A receiving space can be provided to receive the opened top 2. The receiving space may be coverable at least in part by a rear cover H, which may be movable or may remain stationary. The rear cover may provide dual functions. It may at least partially cover the receiving space for the top 2 and may also at least partially cover a baggage space, which may include the receiving space for the top.

The top 2 includes sunroof part 4 in the front region of the top. The sunroof part is movable with respect to the surrounding top region 5 closed top position. The opening of only the sunroof part 4 can be seen in the transition from FIG. 1 to FIG. 2. The surrounding top region 5 is of U shape in a plan view. The front edge of the sunroof part 4 in the closed position simultaneously forms the front edge of the top 2 and when the entire top is in the closed position, the front edge of the sunroof part directly adjoins the windshield frame 3. This arrangement is not mandatory. An air deflector or a similar assembly can also be arranged between the sunroof part and the windshield frame, for example.

Figure 1:
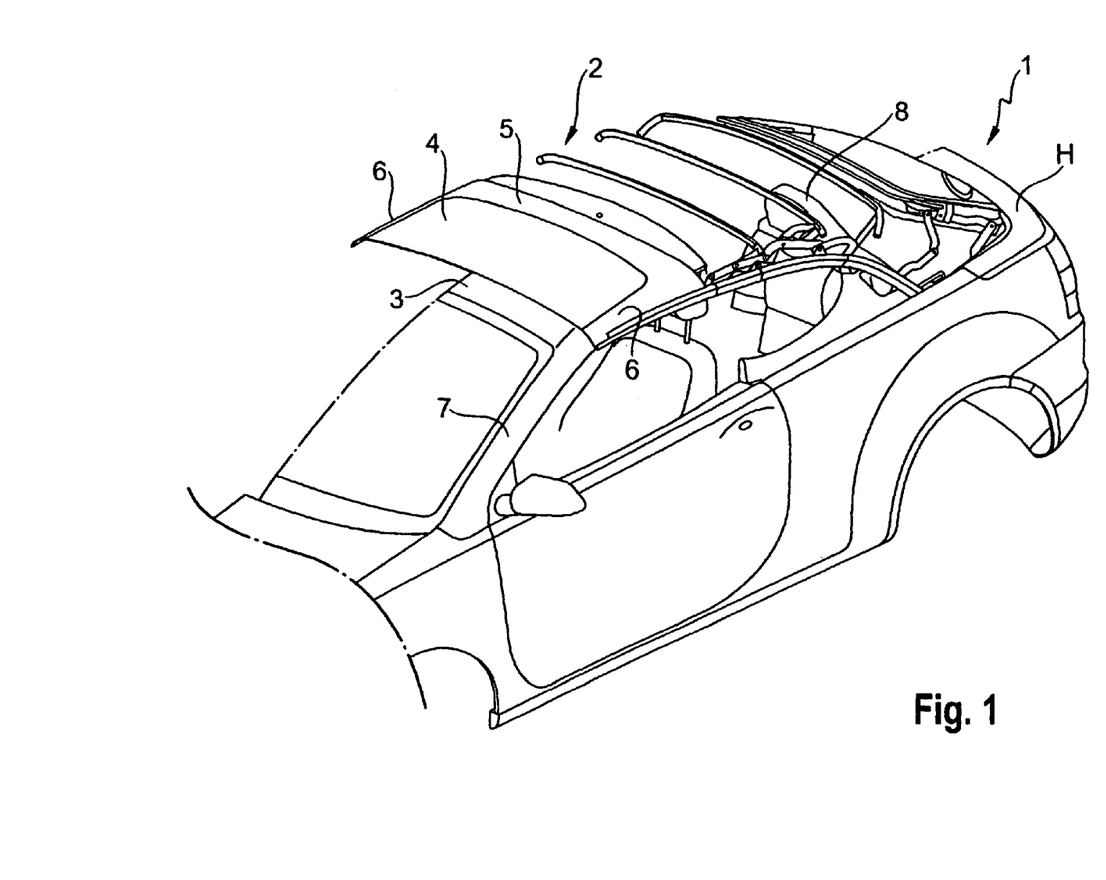
FIG. 1 is a schematic perspective view of a convertible vehicle in accordance with an embodiment of the present invention, shown obliquely from the front with the top closed overall and the sunroof part closed.
Figure 2:
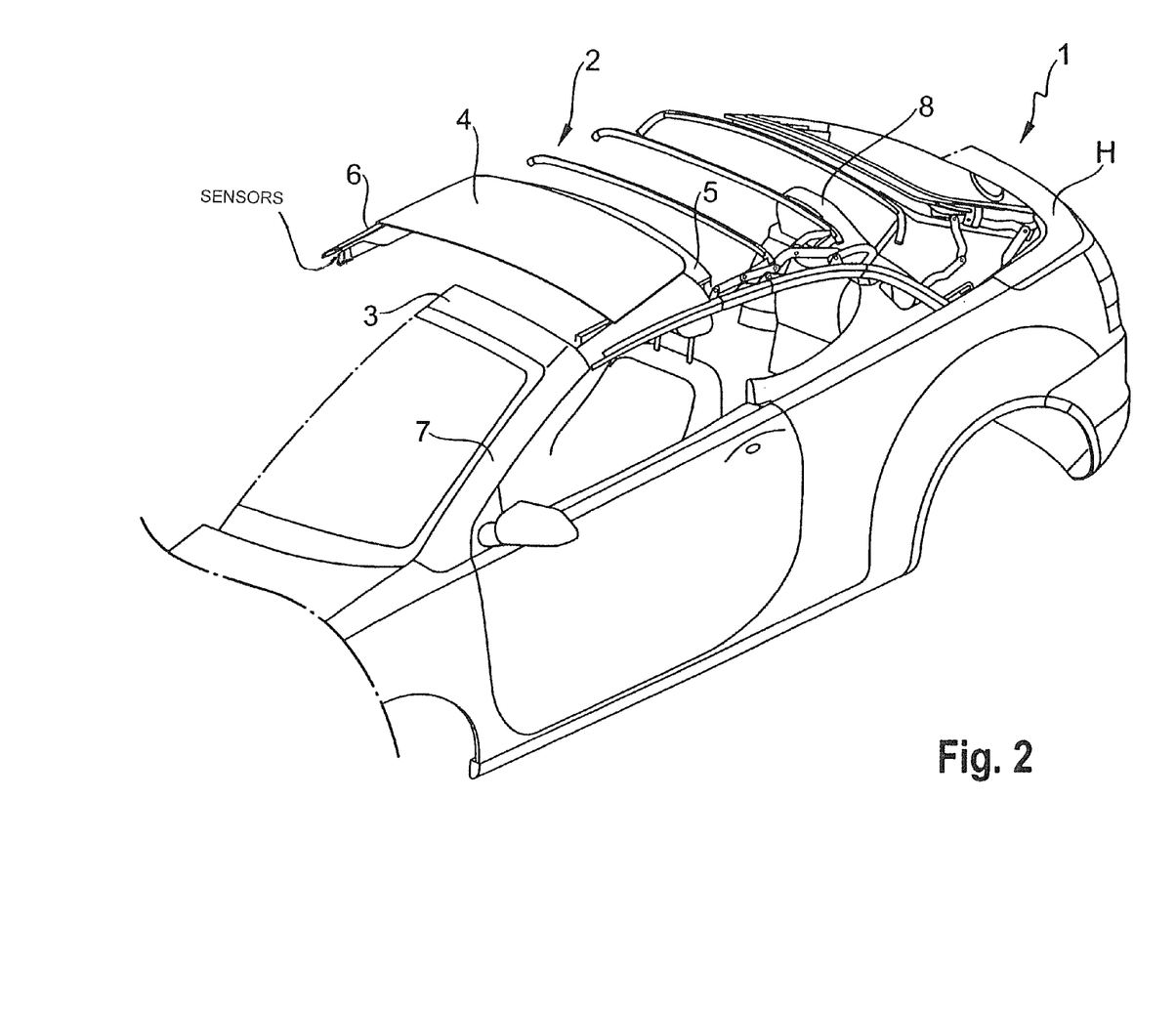
FIG. 2 is a similar view to FIG. 1 with the sunroof part partially open and the top otherwise closed.
Figure 3:
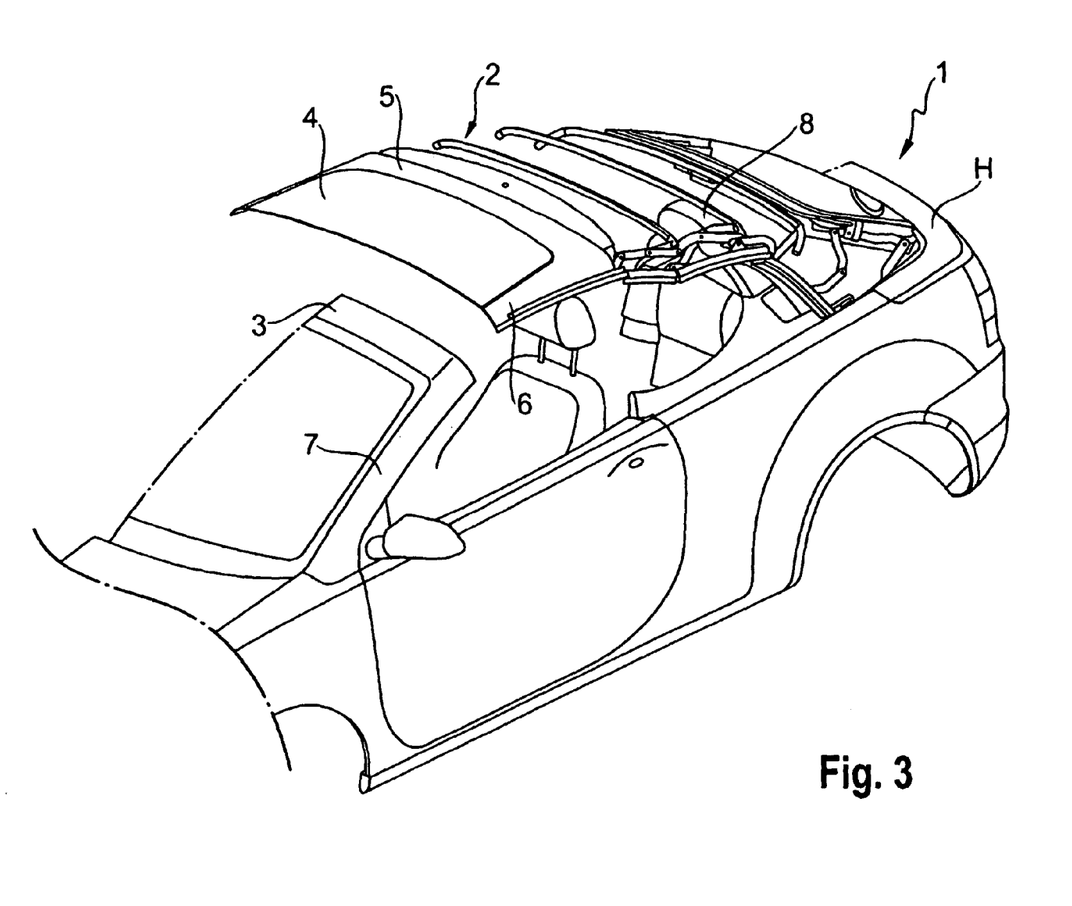
FIG. 3 is a similar view to FIG. 1 with the top starting to open from the closed position shown in FIG. 1 with the sunroof part closed.
Figure 4:
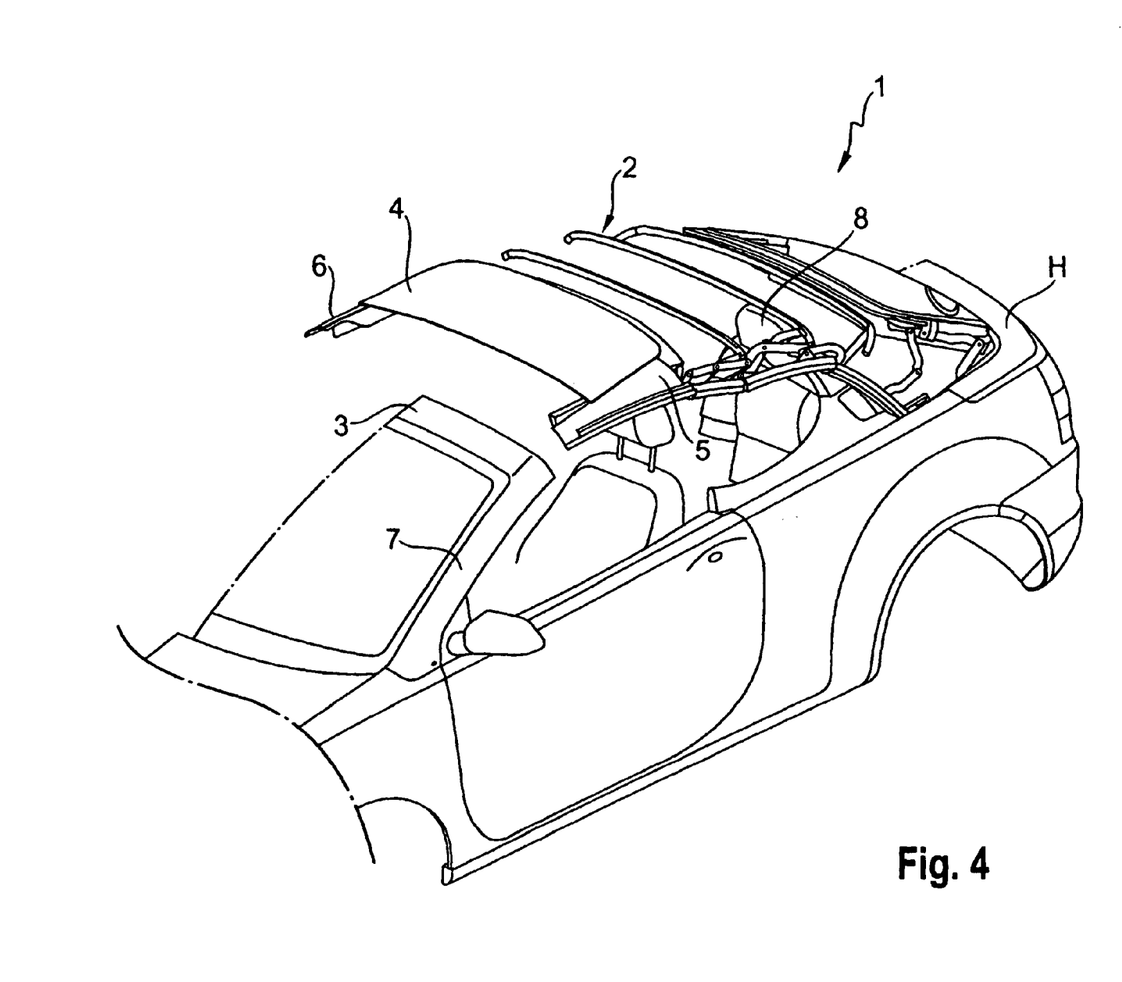
FIG. 4 is a similar view to FIG. 3 with the top starting to open from the closed position shown in FIG. 2 with the sunroof part open.
Figure 5:
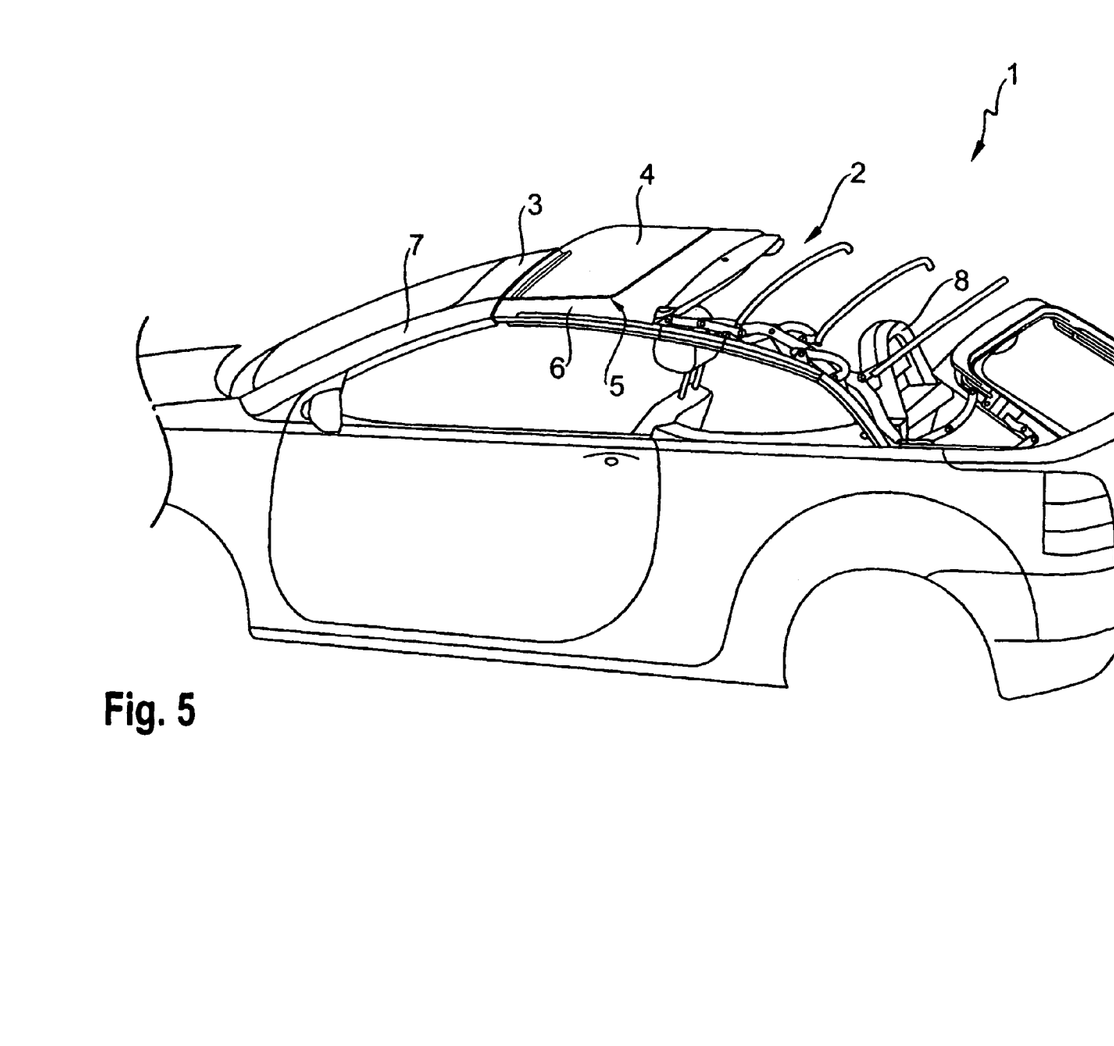
FIG. 5 is a side perspective view, shown obliquely from the rear, of the convertible vehicle of FIG. 1 with the top and the sunroof part closed.
Figure 6:
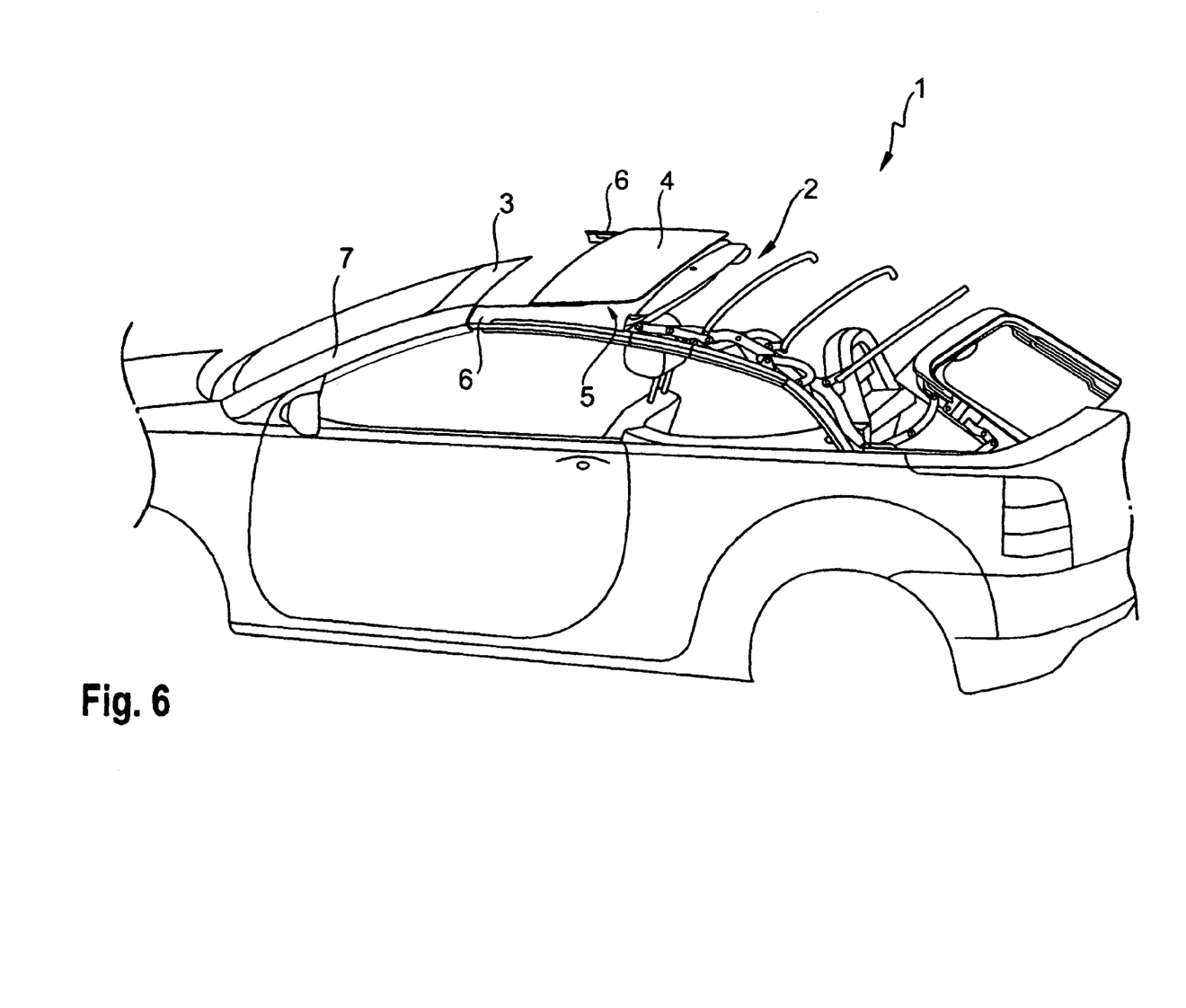
FIG. 6 is a similar view to FIG. 5 with the sunroof part partially open and the top otherwise closed.

In the illustrated U-shaped configuration of the surrounding top region 5, limbs 6 of the top region 5 laterally border the sunroof part 4 when the sunroof part is in the closed position. As shown in FIGS. 1 and 2, when the top is in the closed position, the limbs 6 may be connected to the front lateral pillars 7, or A pillars, or their extensions. This allows the sunroof part 4 to be particularly wide. This design may avoid the need for a crossmember at the front of the top 2, which would otherwise have latching elements to hold the top 2 to the windshield frame 3. As such, the sunroof part 4 can also have a large depth advantageous for a good open-air feeling and feeling of light and can form the frontmost end of the movable top 2 in the middle.

Figure 9:
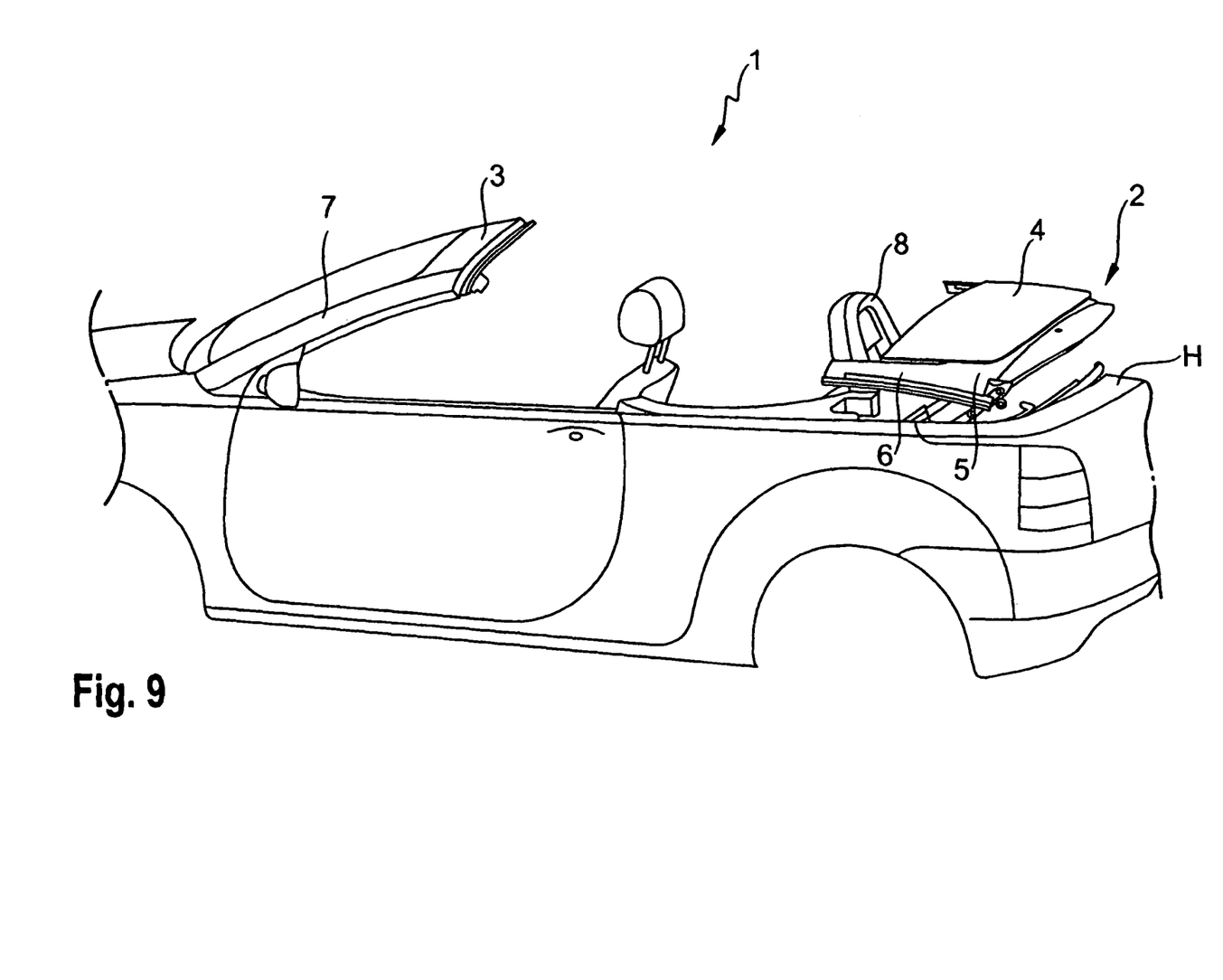
FIG. 9 is a similar view to FIG. 8 with the top opening further, shortly before reaching the stowed top position.
Figure 10:
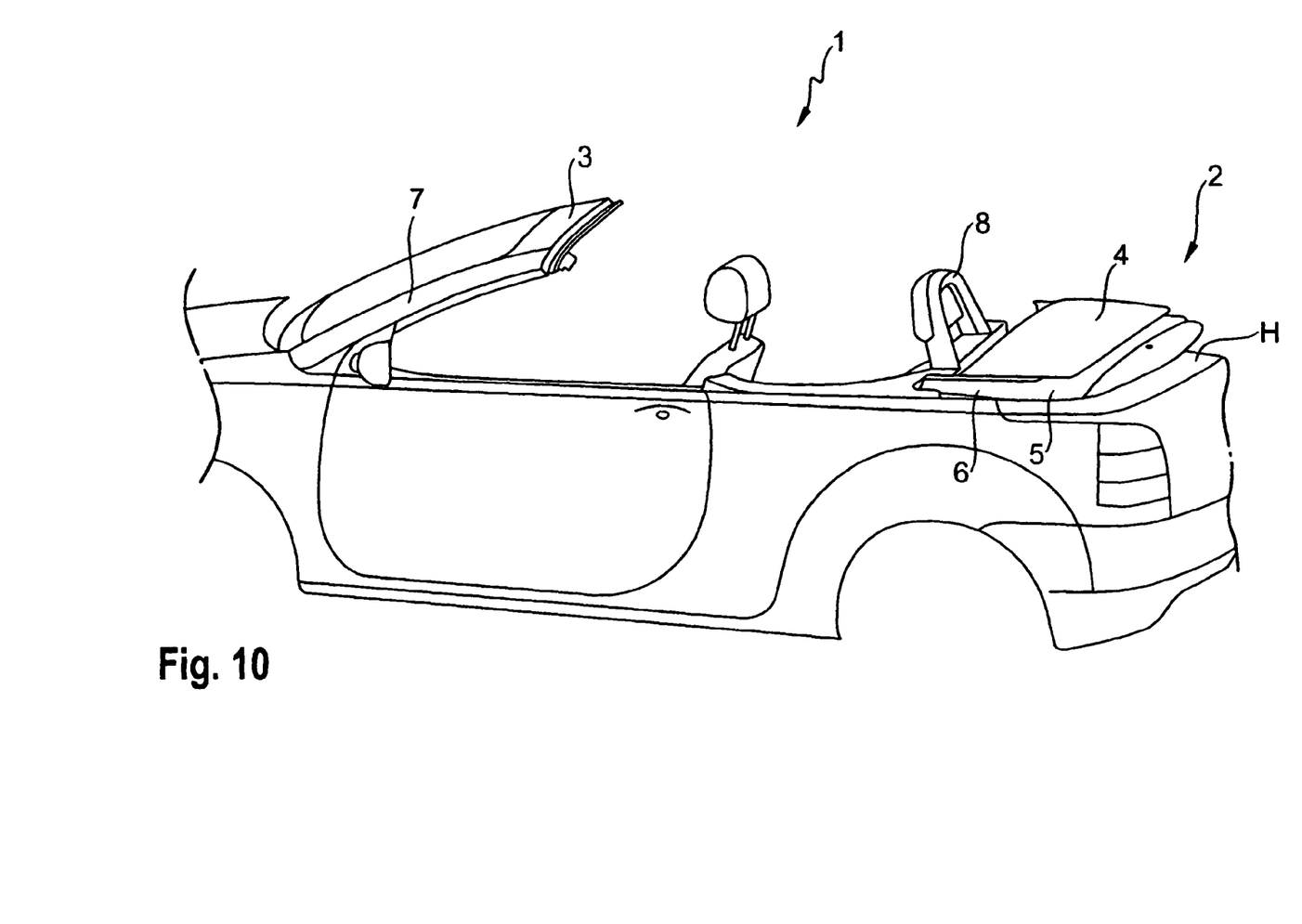
FIG. 10 is a similar view to FIG. 9 with the top in a stowed top position.
Figure 11:
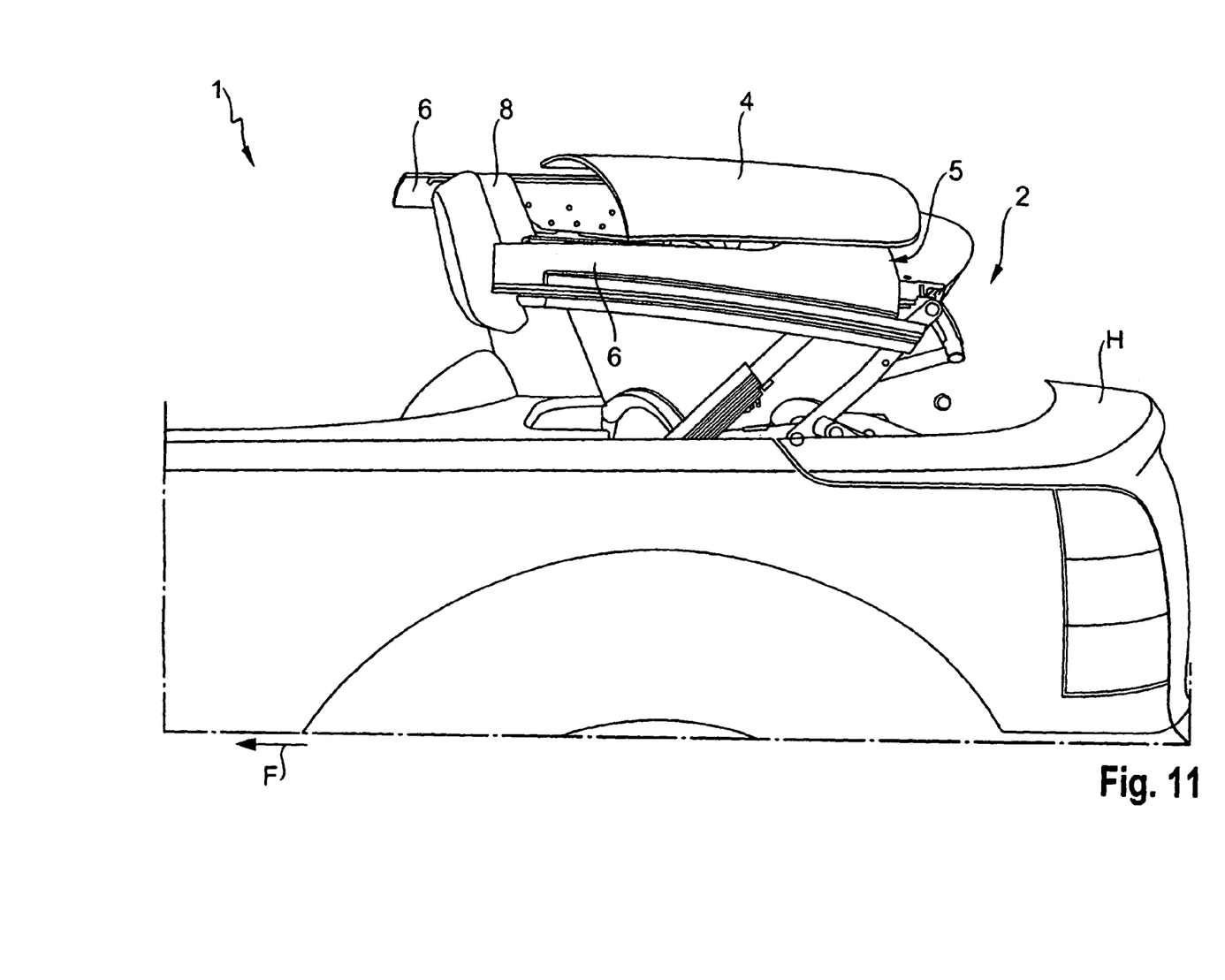
FIG. 11 is a detailed enlargement of the rear vehicle region in a side view during the top opening, approximately corresponding to the top opening position of FIG. 9.

To open the entire top 2 into the convertible position (see, for example, FIG. 12), and to avoid collisions or interference, the sunroof part 4 is disposed to the rear, that is opened, during at least a part of the movement of the sunroof part 4. The sunroof part 4 is, for example, movable beyond the headrests 8 of a rearmost row of seats when in its completely open position (FIG. 9). The limbs 6 can run laterally past these headrests 8 (or also the heads of occupant). The sunroof part 4 is in the middle region of the front of the top, so it is necessary for the sunroof part 4 to avoid a collision during opening of the entire top. Depending on the spatial conditions, the sunroof part does not need to be moved into the rear extreme position, but may be moved to a position that is somewhat further forward. In some embodiments, the sunroof part 4 may be opened rearwardly by at least 20 centimeters with respect to its closed position, so that a good open-air feeling is ensured is avoided.

Figure 7:
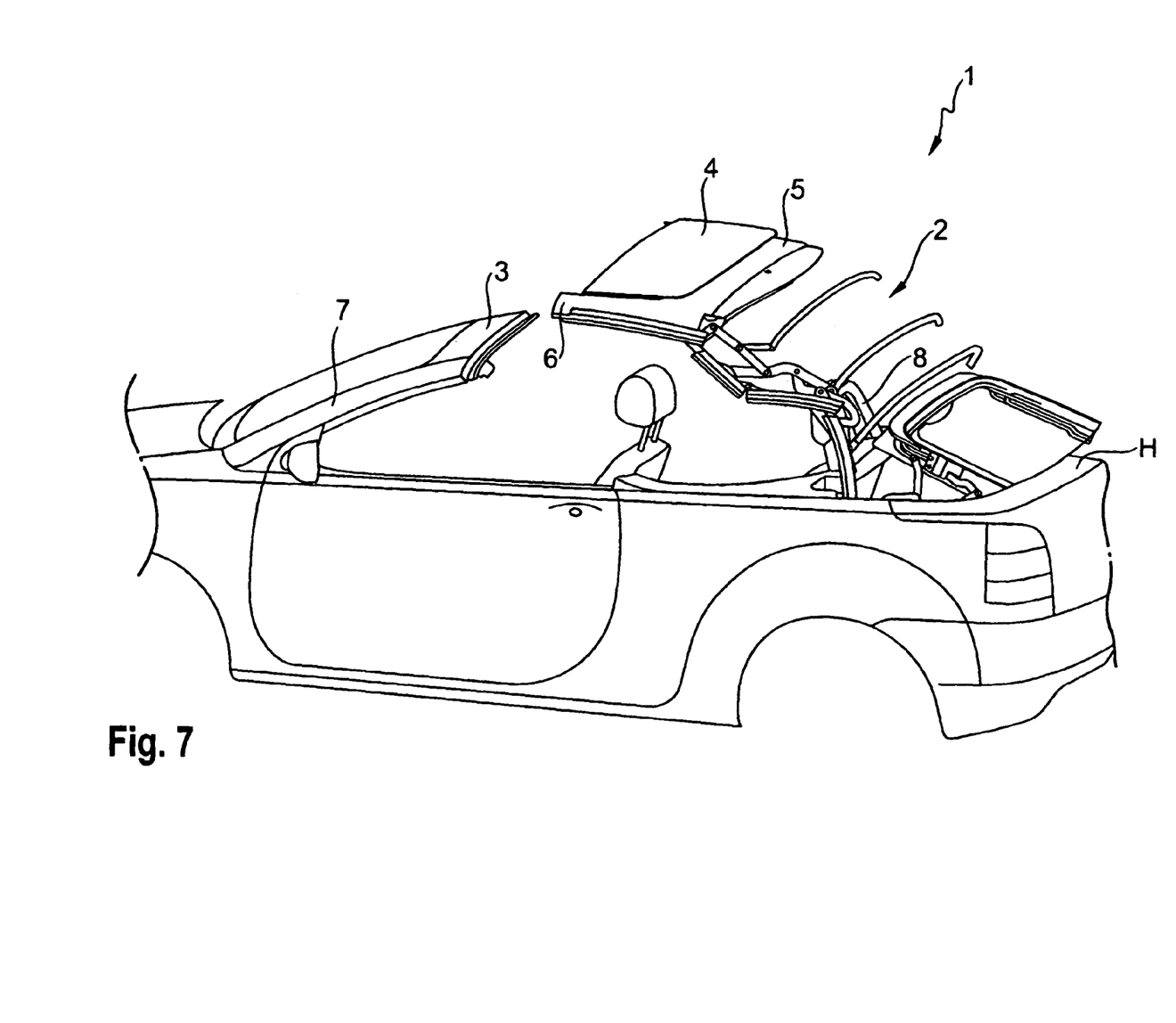
FIG. 7 is a similar view to FIG. 5 during the top opening from the closed position with a closed sunroof part, with the sunroof part being automatically moved towards and open position while the top is opening.
Figure 8:
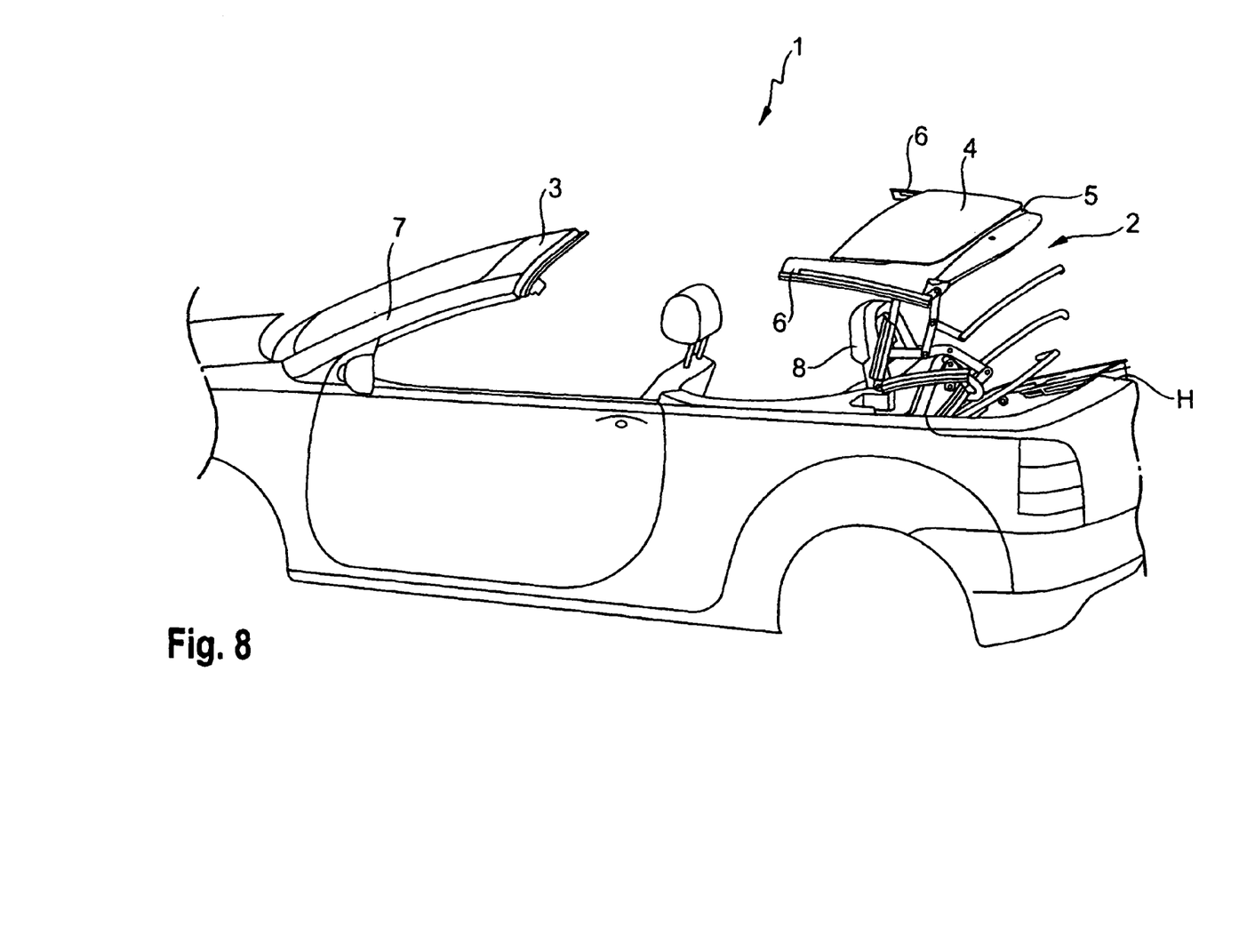
FIG. 8 is a similar view to FIG. 7 with the top opening further.

The top 2 may be moved out of its closed position both from a first closed position with the sunroof part 4 closed (FIG. 1) and from a second closed position with the sunroof part 4 open (FIG. 2). Preferably, it is not necessary to first move the sunroof part 4 out of the position of FIG. 1 while the top is closed. The sunroof part 4 automatically moves into the collision-avoiding position in accordance with FIG. 9 during the opening of the top, as shown in FIGS. 7 to 9. Therefore, the top can be moved from the latching to the windshield frame at an early time or it can move before the start of the sunroof displacement.

In some embodiments, a top may be opened with the sunroof part in any desired intermediate position. The user therefore does not have to worry about the instantaneous condition of the sunroof part 4 when the top is closed. The sunroof part is automatically displaced into the collision-avoiding open position as the top opens. If the sunroof part is already in the collision-avoiding position, with the top, the sunroof part may remain in this position. The optionally required displacement of the sunroof part 4 takes place at the same time as the top movement. The opening time of the top 2 may remain the same independently of the respective starting condition of the sunroof part 4.

To control this required movement of the sunroof part 4, which differs depending on the starting situation, an automatic polling of the instantaneous position of the sunroof part 4 is carried out. This may be accomplished, for example, via contactless sensors, potentiometers or end position switches, at the start of the top opening, while the limbs 6 are latched or as the top region 5 starts moving. An electronic control automatically effects the described moving of the sunroof part 4 into its collision-avoiding open position relative to the surrounding top regions 5 or a holding of the sunroof part 4 in this position using these input data during the top opening.

The sunroof part 4 can therefore be exposed to force in different manners during the top movement or can also remain unmoved relative to the surrounding top regions 5. A drive for the displacement of the sunroof part 4 is for this purpose to be controlled independently of a drive for the top movement.

Figure 12:
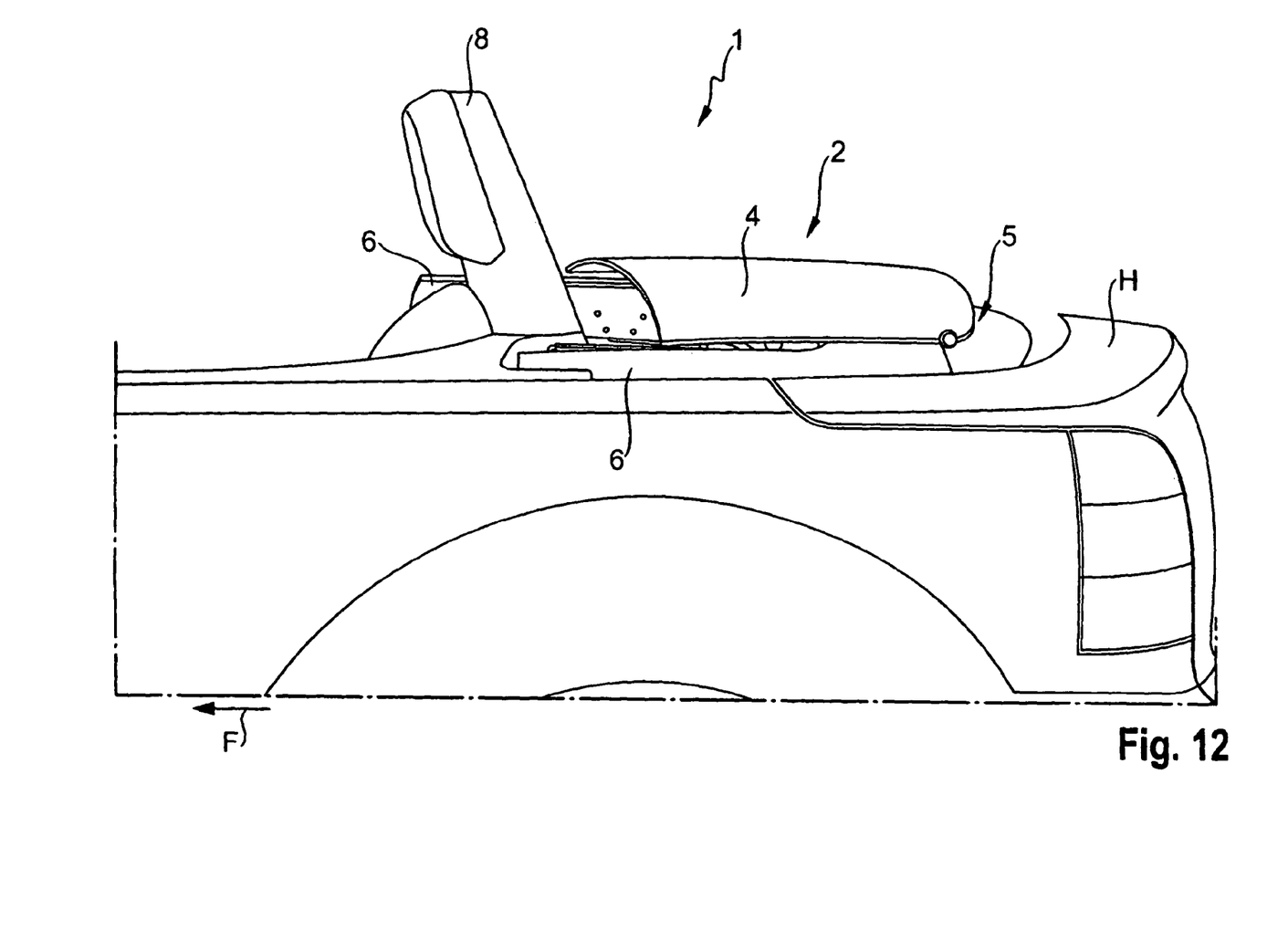
FIG. 12 is a similar view to FIG. 11 in the stowed top position in accordance with FIG. 10.
Figure 13:
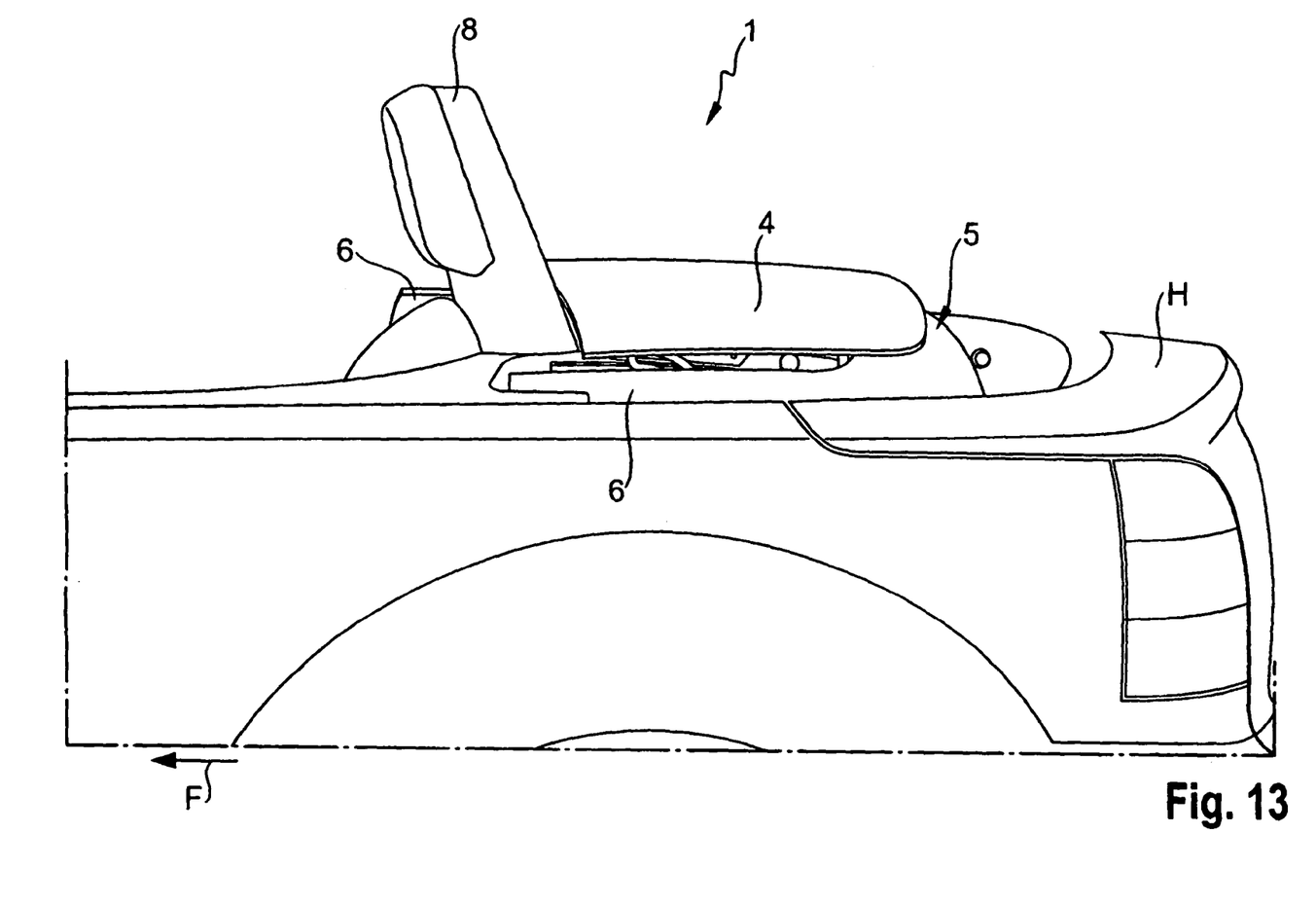
FIG. 13 is a similar view to FIG. 12 with the sunroof part moved back partly to the front into an intermediate position in a stowed top position.
Figure 14:
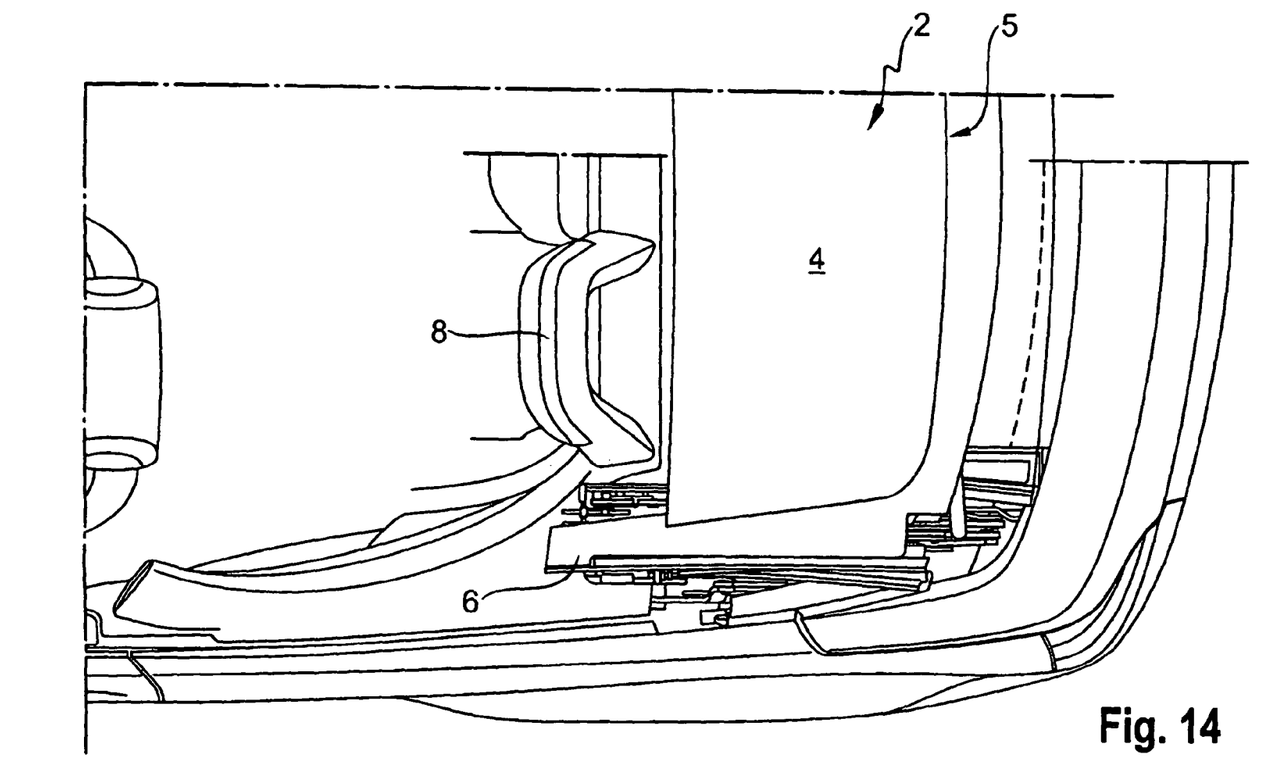
FIG. 14 is a plan view of the vehicle rear with the top in the position of FIG. 11.
Figure 15:
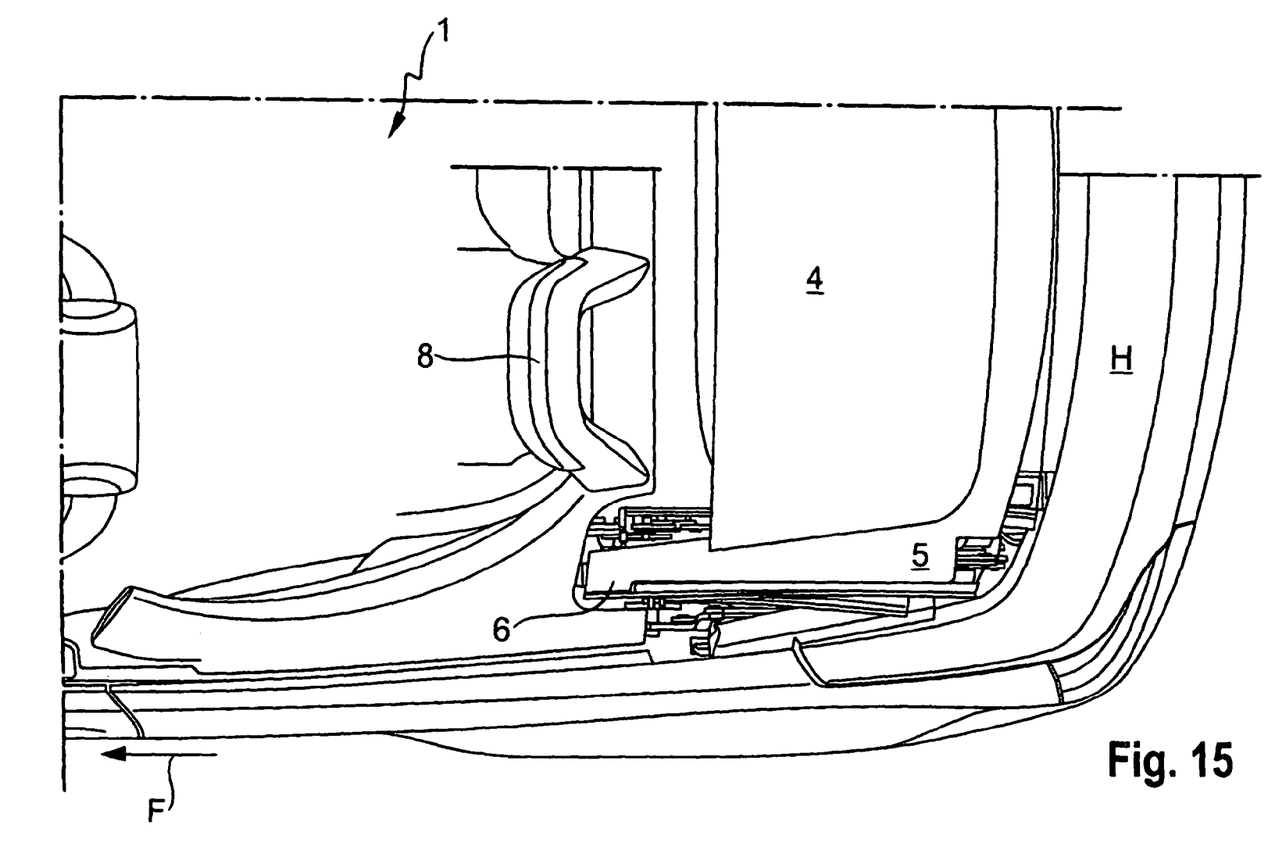
FIG. 15 is a similar view to FIG. 14 with the top in the stowed position of FIG. 12.
Figure 16:
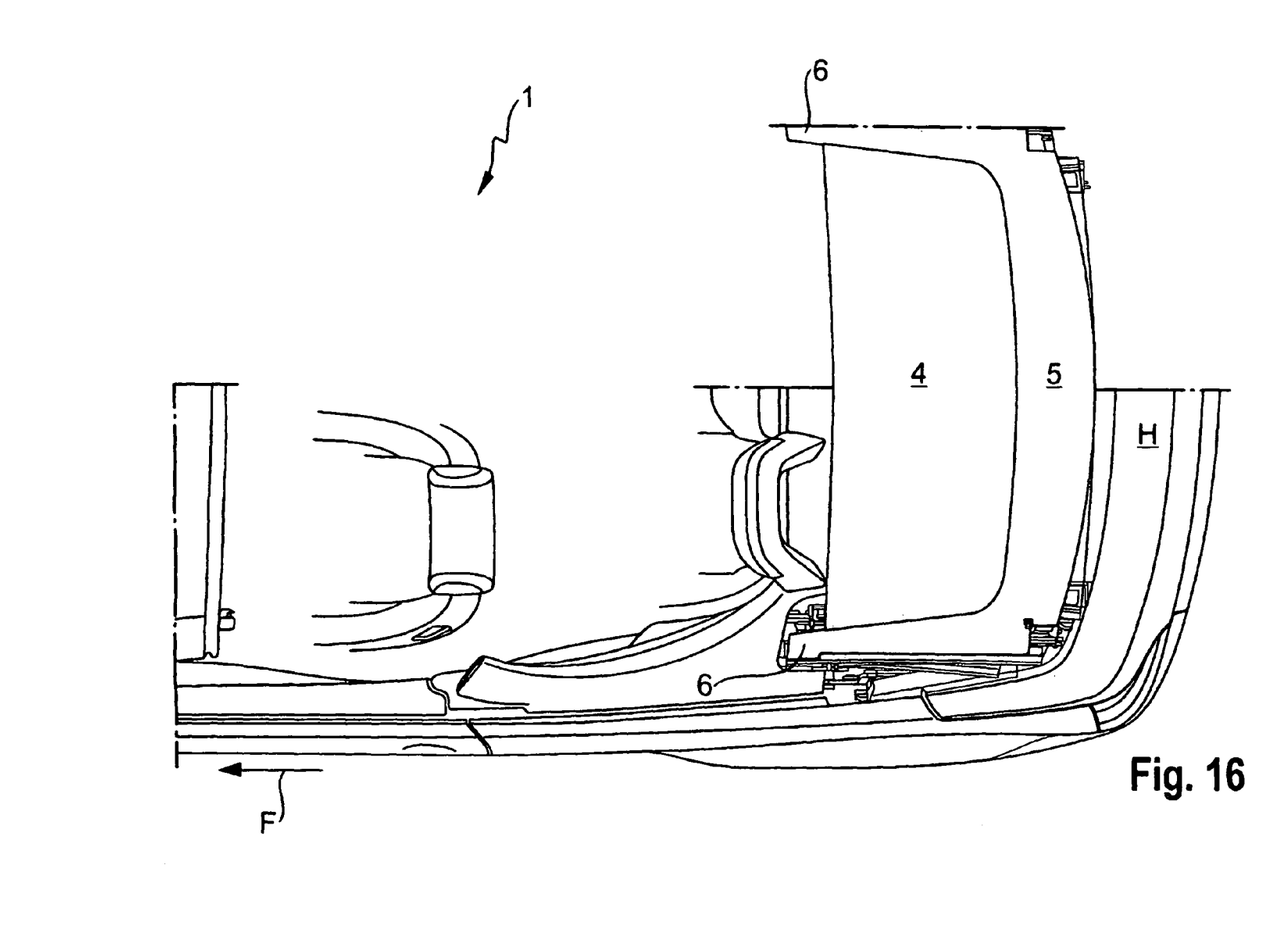
FIG. 16 is a similar view to FIG. 15 with the top in the stowed position of FIG. 13, with the sunroof moved back forwardly.

Once the top is stowed, it is no longer necessary to keep the sunroof part 4 in a collision-avoidance position disposed to the rear (FIG. 12 and FIG. 15). Therefore, the sunroof part 4 can be automatically movable back into an intermediate position displaced further to the front (FIG. 13 and FIG. 16) before the top reaches the completely open position. In other words, the sunroof may be moved in the direction of travel F out of the collision-preventing position, as seen in the transition from FIG. 12 to FIG. 13. As shown in FIG. 13, the sunroof part 4 may directly adjoin the rear headrests and/or rollover protection 8. The region disposed thereunder can thus be secured against intervention from outside by the sunroof part 4 acting as a cover.

In the drawing, the sunroof part 4 can be moved over a top region 5 disposed behind it. Alternatively, with corresponding spatial conditions and sufficient headroom, it would also be possible that it can be moved into a receiving pocket of this top region. It is furthermore possible that the sunroof part 4 is not in one piece, but is rather, for example, designed flexibly in the manner of a rolling top or in the manner of a segmental top with a plurality of transverse elements behind one another. An erection of the sunroof is equally possible; it does not only have to be movable to the rear, but can rather also be able to be positioned obliquely or even vertically upwardly. It is also possible that the sunroof part 4 is only upwardly positionable when the top is open. The sunroof part may be held upright in this position as a windstop when the top is open, with the sunroof part either in front of the headrests 8 or behind them after the sunroof has been moved rearwardly. Such a displacement can also take place in accordance with the invention independently of the respective sunroof position in the closed position of the top 2.

In any case, the opening of the sunroof part 4 into its collision-preventing position can be carried out by the present invention integrally with the top opening without having to carry out a complete sunroof movement into the rearwardly moved collision-preventing position before the raising of the top 2 from the windshield frame 3.

As will be clear to those of skill in the art, the herein disclosed embodiments of the present invention may be altered without departing from the scope or teaching of the present invention. It is the following claims, including all equivalents, which define the scope of the invention.

The invention claimed is:

1. A convertible vehicle having a vehicle body with a passenger compartment defined therein, the convertible vehicle comprising:
    a movable top having a closed position wherein the top extends over the passenger compartment and an open position wherein the top is stowed;
    the moveable top including lateral limbs and a sunroof part that is movable with respect to a surrounding top region, the sunroof part having a closed position and an open position;
    the sunroof part forming the frontmost end of the movable top in the middle with respect to the transverse direction of the vehicle;
    wherein the top is movable from the top closed position with the sunroof part in the closed position and the top is movable from the top closed position with the sunroof part in the open position; and
    in the top open position, the lateral limbs overlap a headrest in a side view.

2. A convertible vehicle in accordance with claim 1, wherein the top is also movable from the top closed position with the sunroof part in any position between a fully closed and a fully open position.

3. A convertible vehicle in accordance with claim 1, wherein:
    the convertible vehicle includes a windshield frame;
    the surrounding top region includes said limbs transversely bordering the sunroof part; and
    when the top is in the top closed position, the limbs abut the frame.

4. A convertible vehicle in accordance with claim 1, wherein:
    the convertible vehicle further includes sensors for automatic determination of the position of the sunroof part.

5. A convertible vehicle in accordance with claim 1, further comprising an independent drive for the sunroof part so that the sunroof part is operable independently of the top movement.

6. A convertible vehicle in accordance with claim 1, wherein:
    the sunroof part is movable rearwardly by at least 20 centimeters with respect to its closed position.

7. A convertible vehicle in accordance with claim 1, wherein:
    the sunroof part is moved to an interference-preventing position during at least part of the movement of the top from the top closed position to the top open position; and
    the sunroof part in the interference-preventing provides clearance for the top moving past headrests of a rearmost row of seats or past rollover protection.

8. A convertible vehicle in accordance with claim 1, wherein:
    the sunroof part is automatically moved back from the closed position into an intermediate position before the movable top reaches of the top open position.

9. A convertible vehicle in accordance with claim 1, wherein:
    the sunroof part may be disposed in any position between a partially open and a fully open position when the top is in the top open position.

10. A convertible vehicle in accordance with claim 1, wherein:
    the passenger compartment includes front and rear seats.

* * * * *